(12) United States Patent
Bjerkestrand et al.

(10) Patent No.: US 8,300,515 B2
(45) Date of Patent: Oct. 30, 2012

(54) METHOD AND DEVICE FOR RECORDING SOUNDTRACKS ONTO FILM

(76) Inventors: Rune Bjerkestrand, Drammen (NO); Trond Jørgensen, Drammen (NO)

( * ) Notice: Subject to any disclaimer, the term of this patent is extended or adjusted under 35 U.S.C. 154(b) by 700 days.

(21) Appl. No.: 11/662,142

(22) PCT Filed: Sep. 9, 2005

(86) PCT No.: PCT/NO2005/000332
§ 371 (c)(1), (2), (4) Date: Oct. 30, 2007

(87) PCT Pub. No.: WO2006/028385
PCT Pub. Date: Mar. 16, 2006

(65) Prior Publication Data
US 2008/0056099 A1      Mar. 6, 2008

(30) Foreign Application Priority Data
Sep. 9, 2004 (NO) .................................... 20043791

(51) Int. Cl.
*G11B 7/00* (2006.01)
(52) U.S. Cl. .......................................... 369/125; 369/107
(58) Field of Classification Search .................. None
See application file for complete search history.

(56) References Cited

U.S. PATENT DOCUMENTS

| | | |
|---|---|---|
| 3,999,842 A | 12/1976 | Niederhauser et al. |
| 4,553,833 A | 11/1985 | Kanaoka et al. |
| 4,600,280 A | 7/1986 | Clark |
| 5,194,996 A * | 3/1993 | Shores ............................ 360/48 |
| 5,485,232 A | 1/1996 | Saito et al. |
| 5,550,603 A * | 8/1996 | Yoshimura et al. ............. 352/27 |
| 5,841,513 A * | 11/1998 | Yoshimura et al. ............. 352/27 |
| 6,429,922 B1 * | 8/2002 | Fujita ............................. 352/26 |
| 7,126,663 B2 * | 10/2006 | Valenzuela et al. ............. 352/27 |
| 2002/0024595 A1 * | 2/2002 | Spence et al. .................. 348/96 |
| 2003/0165087 A1 * | 9/2003 | Poetsch et al. ............. 369/13.56 |

(Continued)

FOREIGN PATENT DOCUMENTS

EP    0 600 677 A1    6/1994

(Continued)

OTHER PUBLICATIONS

Håvard Simonsen, "Filmrevolusjon i Drammen," May 3, 2004, Forskning.no, 3 sider, Internet:http://www.fosknino.no/Artikkler/2004/mai/1083145090.87 (Mar. 30, 2005).

*Primary Examiner* — Peter Vincent Agustin
*Assistant Examiner* — Emily Frank
(74) *Attorney, Agent, or Firm* — Finnegan, Henderson, Farabow, Garrett & Dunner, L.L.P.

(57) ABSTRACT

The invention relates to the recording of soundtracks onto analogue cinema film, in particular the recording of digital created and/or digital/electronically stored representations of soundtracks onto film. The method according to the invention for comprises converting sound data from the digital soundtracks to sound image data, modulating light based on the sound image data, and imaging the modulated light onto a photosensitive film. The device according to the invention comprises at least one light source, processing electronics for converting sound data from the digital soundtracks to sound image data, at least one full frame device connected to the processing electronics, adapted for modulating light from the light source according to the sound image data, imaging optics for imaging the modulated light onto a photosensitive film.

10 Claims, 5 Drawing Sheets

U.S. PATENT DOCUMENTS

2005/0111759 A1* 5/2005 Perlmutter et al. .......... 382/294

FOREIGN PATENT DOCUMENTS

| | | |
|---|---|---|
| GB | 1567693 | 5/1980 |
| JP | 5-40938 | 2/1993 |
| WO | WO 93/13457 A | 7/1993 |
| WO | WO 03/025910 A1 | 3/2003 |
| WO | WO 03/096685 A1 | 11/2003 |

* cited by examiner

METHOD AND DEVICE FOR RECORDING SOUNDTRACKS ONTO FILM

BACKGROUND

The invention relates to the recording of soundtracks onto analogue cinema film, in particular the recording of digital created and/or digital/electronically stored representations of soundtracks onto film.

Optical recording is the most common method employed for analogue motion picture sound tracks. This method uses a variable area method where illumination from a calibrated light source is passed through a shutter modulated by the audio signal. The shutter opens in proportion to the intensity or level of the audio signal and results in the illumination beam from the light source being modulated in width. This varying width illumination is directed to expose a monochromatic photographic film which when processed, for example, results in a black audio waveform envelope surrounded at the waveform extremities by a substantially clear or coloured film base material. In this way the instantaneous audio signal amplitude is represented by the width of the exposed and developed film track. FIG. 1 depicts in greatly simplified form an arrangement for recording a variable width analogue audio sound track.

The audio modulation, i.e. the sound, can be recovered by suitably gathering, for example by means of a photo detector, illumination transmitted through the sound track area. The signal from the photo detector can then be used as input to the audio system/loudspeakers.

This technique can be subject to imperfections, physical damage and contamination during recording, printing and subsequent handling. Since these recording techniques use photographic film, the exposure time is a critical parameter. In addition can imperfections occur, for example the density of the exposed or unexposed areas can vary randomly or in sections across or along the sound track area. During audio track playback such density variations can directly translate into spurious noise components interspersed with the wanted audio signal.

Further the sound track must be copied to the image film in a succeeding process, which causes further possibilities for errors.

SUMMARY

There is thus a need for a method and a device for more efficient and more reliable/accurate recording of sound tracks on film.

The object of the invention is to provide a method and a device which meet this need.

The object of the invention is achieved by means of the features in the patent claims.

The device according to the invention comprises at least one light source, processing electronics for converting sound data from the soundtracks to sound image data, at least one full frame device connected to the processing electronics, adapted for modulating light from the light source according to the sound image data, and imaging optics for imaging the modulated light onto a photosensitive film.

The data source which provides the sound data to the processing electronics, may be a computer used in creating digital sound data or other external source of analogue or digital sound data. The sound data is typically pre-processed (e.g. Dolby or Sony sound format) analogue or digital signals aimed for use by prior art sound recording systems. The sound data is converted to sound image data adapted for being imaged onto a positive or negative film. The purpose of the conversion is to create an image which corresponds to the desired physical/visual representation on the final film. The converted data is in one embodiment full frame image data.

A well known phenomena in the film industry is "image spread". Image spread means that exposing light will spread out nearby areas of the film that was not intended to be exposed. This is cased by light-scattering in the film layers and eventually in the film base. This effect will deform the sound tracks and introduce distortion to the sound.

When printing directly to print film, image spread must be accounted for in the forming of the sound image. The different embodiments of the invention, e.g. printing on sound negative, intermediate film, positive film, must therefore use different processing of the sound image.

The light modulation is performed by use of one or several full frame light modulation device(s), such as one or several DMD(s), transmissive or reflective LCD, or other types of micro display units or other suitable light modulation/imaging devices. With "full frame" in this context it is meant a picture comprising a number of lines and columns higher than 1 (array of pixels) in each frame. The light is modulated based on the sound image data created in the converting step described above. This means that the light modulation creates an image of the sound track to be recorded on the film, and this image is transferred to the film by means of e.g. imaging optics.

By using a micro display unit such as a DMD, the quality of the recorded sound is substantially improved, both with respect to accuracy, resolution and uniformity, according to prior art. Improved quality of the recorded sound images leads to improved quality of the played back sound and thus to an improved experience for the audience.

In one embodiment, the device according to the invention also comprises a film transportation device adapted for transporting the photosensitive film with a continuous movement. The film transportation device comprises rollers forming two magazines, one supply magazine for unexposed, and a second storage magazine for exposed photosensitive material, e.g. film. Their storage capacities may be e.g. 305, 610 or 1220 metres. The transportation device further comprises film guide locks for securing the photosensitive material in the right position.

In one embodiment, the film transportation device comprises an omega-loop, and the imaging optics is arranged to image the modulated light onto the film in this loop. The omega-loop is a loop in the film path to ensure continuous movement of the film in the sound recording area. The continuous movement can be maintained even if the movement caused by the film transportation device is intermittent.

The imaging optics is arranged near the loop, thus exposing the images onto the film in the loop. It will in most cases be convenient to arrange the light modulation devices in direct connection to/near the imaging optics and thus in proximity to the loop. The number of light modulation devices and imaging optics may vary according to the sound formats to be recorded. In many cases there will be at least two types of sound tracks to record, e.g. Dolby analogue+Dolby digital sound tracks, which usually means that at least two imaging systems (light modulation unit+imaging optics) must be employed. Other types of sound tracks may also be of interest, such as Sony sound system (SDDS), DTS, etc, which may require one or several imaging units. The different sound formats are recorded on different locations along the width of the film, and the imaging devices must be arranged according to this. It may also be possible to combine the sound data for the different formats to combined sound data before exposure onto the film. In this case, there is only need for one imaging unit.

In one embodiment, the omega-loop comprises a guiding wheel for guiding the movement of the photosensitive film. In this embodiment, the film is thread round the guiding wheel, thus forming a loop in the film path. The guiding wheel is rotated by means of a motor which may be controlled by the processing electronics or by a separate control unit. The omega-loop may further comprise two further feed wheels, for further controlling the shape of the loop and thus controlling the movement of the film.

In a farther embodiment, the film transportation device comprises a rotation indicator for providing a signal representing the movement of the photosensitive film in the omega-loop. The rotation indicator may be a device which counts the rotation and outputs a known number of pulses for each rotation of the wheel (rectangular waveform), a signal indicating the rotation angle, rotation speed, etc.

The rotation indicator is in one embodiment adapted for sensing the rotation of the guiding wheel.

The signal from the rotation indicator may be used as feed-back to the processing electronics. The rotation indicator signal provides information about the movement of the film in the path, and this information may be used by the processing electronics or other suitable control device, to control the timing of the recording of the images. The timing is important to ensure that the sound is synchronized with the pictures and to provide correct exposing of the images.

The rotation indicator may in one embodiment sense variations in rotation speed, and thus compensate for these variations when exposing the images by delaying or accelerating the forwarding of image data to the light modulating device(s). This leads to constant speed of the sound when played back.

In one embodiment of the invention, the sound image is recorded on the film in a "rolling" manner, while the film is moving linearly. In this case, the sound image is moved in small steps across the modulation device, synchronized to the feedback signal from the guiding wheel. With this solution, each point on the film will "see" one stationary part of the image during the exposure time.

The typical requirements for wow and flutter for analogue soundtracks on film is better than 0.01%. This traditionally requires a very complex and precisely controlled servo-system, such as the traditional omega-drive. In this embodiment, there is no need for costly and critical motorized drives to ensure low wow and flutter to the written sound image. The feedback signal is reporting the momentary actual movement of the film, and therefore is used as trigger for the scrolling of the sound image. Actually, the film loop can be passive and totally non-critical to speed-variations.

With the rotation indicator feed back of this embodiment of the invention, the requirements to constant speed are less severe, which reduces complexity, costs and the likelihood for errors.

In one embodiment, the device according to the invention also comprises a sprocket sensor. The sprocket sensor senses the locations of the film sprockets and provide feed-back to the processing electronics in a similar way as the rotation indicator feed-back. The feed-back is used by the processing electronics to ensure that the digital sound image is correctly exposed between sprockets such that no information is lost due to exposing sound images onto the sprocket areas. The sprocket sensor may also be used to synchronize different sound formats and to synchronize sound to image, i.e. ensure that correct sound is exposed adjacent to the corresponding image. The latter may simply be performed by counting the sprocket holes.

The object of the invention is also achieved by a method for recording digital soundtracks onto film, comprising converting sound data from the digital soundtracks to sound image data, modulating light based on the sound image data, and image the modulated light onto a photosensitive film.

In a further embodiment, the method further comprises transporting the photosensitive film with a continuous movement in the area of the sound recording.

In one embodiment of the method the modulation is controlled by a control device.

In a further embodiment, the method further comprises providing a signal representing the real movement of the photosensitive film in the exposing area.

In one embodiment of the method, the modulation is synchronised with the movement of the photosensitive film.

BRIEF DESCRIPTION OF THE DRAWINGS

The invention will now be described in more detail with reference to the enclosed figures.

DETAILED DESCRIPTION

Figure 1:
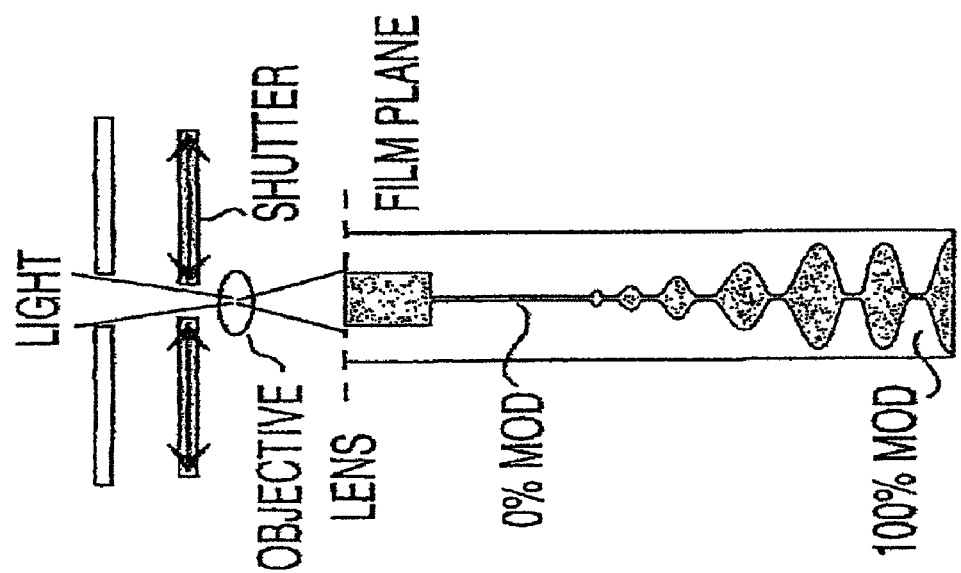
FIG. 1 depicts in greatly simplified form an arrangement for recording a variable width analogue audio sound track according to a prior art method.
Figure 2:
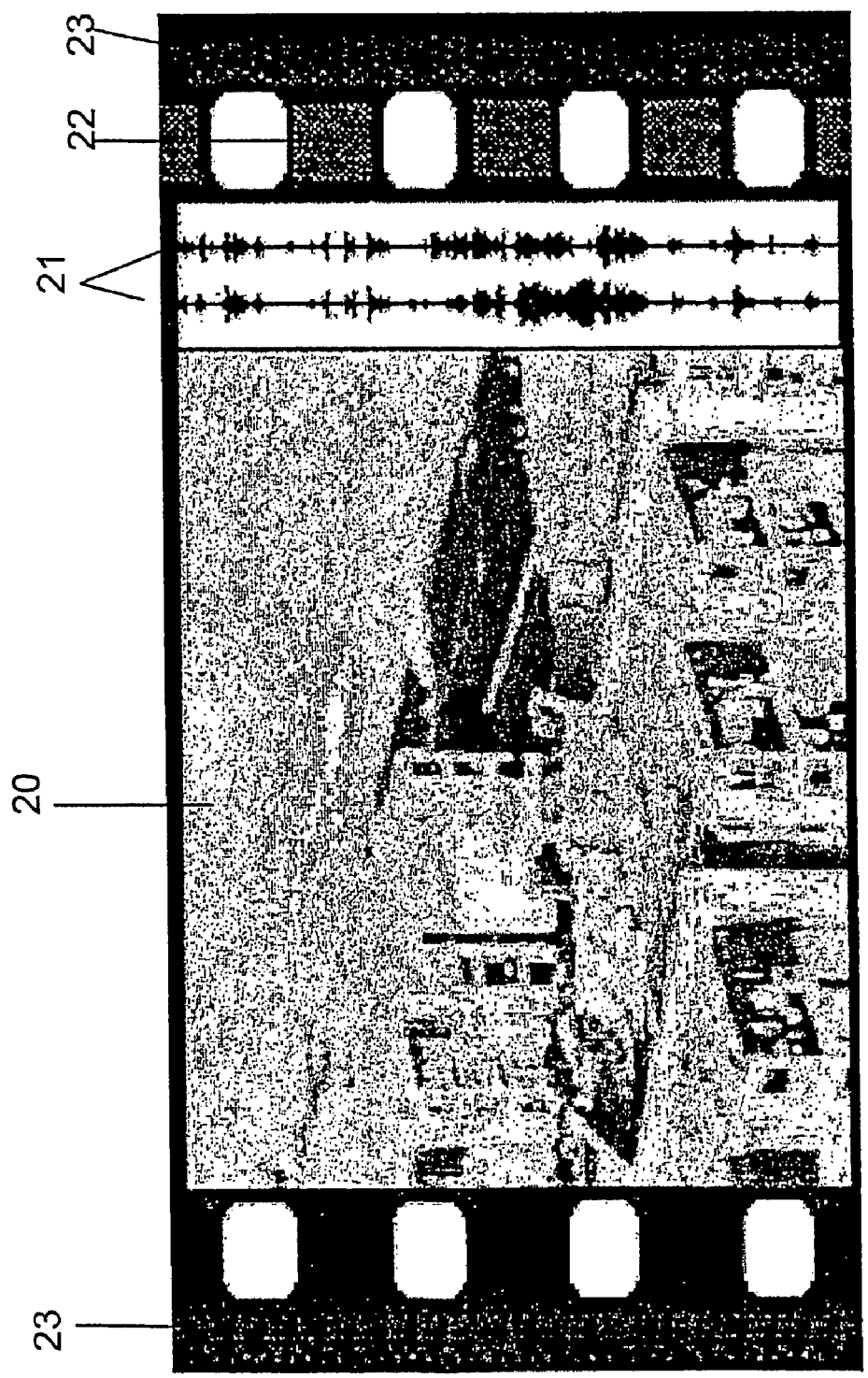
FIG. 2 shows one frame of a cine film with different sound tracks.

FIG. 2 shows one frame of a cinema film with recorded sound tracks. The sound tracks are located on the right and left side of the picture 20. To the right of the image are the two channel analogue sound track 21.

The area 22 between the right sprocket holes is the Dolby Digital 5.1 sound track. Dolby Digital uses 5.1 channels of sound (Center, Front-Left, Front-Right, Rear-Left, Rear-Right, and the 0.1 "sub-woofer").

The area 23 on the outer edges of the sprocket holes is the SDDS (Sony Dynamic Digital Sound). This is the most advanced of the major theatre systems. Unlike Dolby Digital the data bits are printed onto a higher area, which results in higher bandwidth with less compression and more channels. The tracks on the left and right side of the film both contain identical copies of all channels to provide redundancy in case of damage to one side.

A third type of digital sound is DTS (Digital Theatre Sound). DTS uses 5.1 channels, but the data is not printed onto the film. The data is on a CD and the film comprises a time code which the CD is synchronized to. This time code is placed between the analogue tracks and the image.

Figure 3:
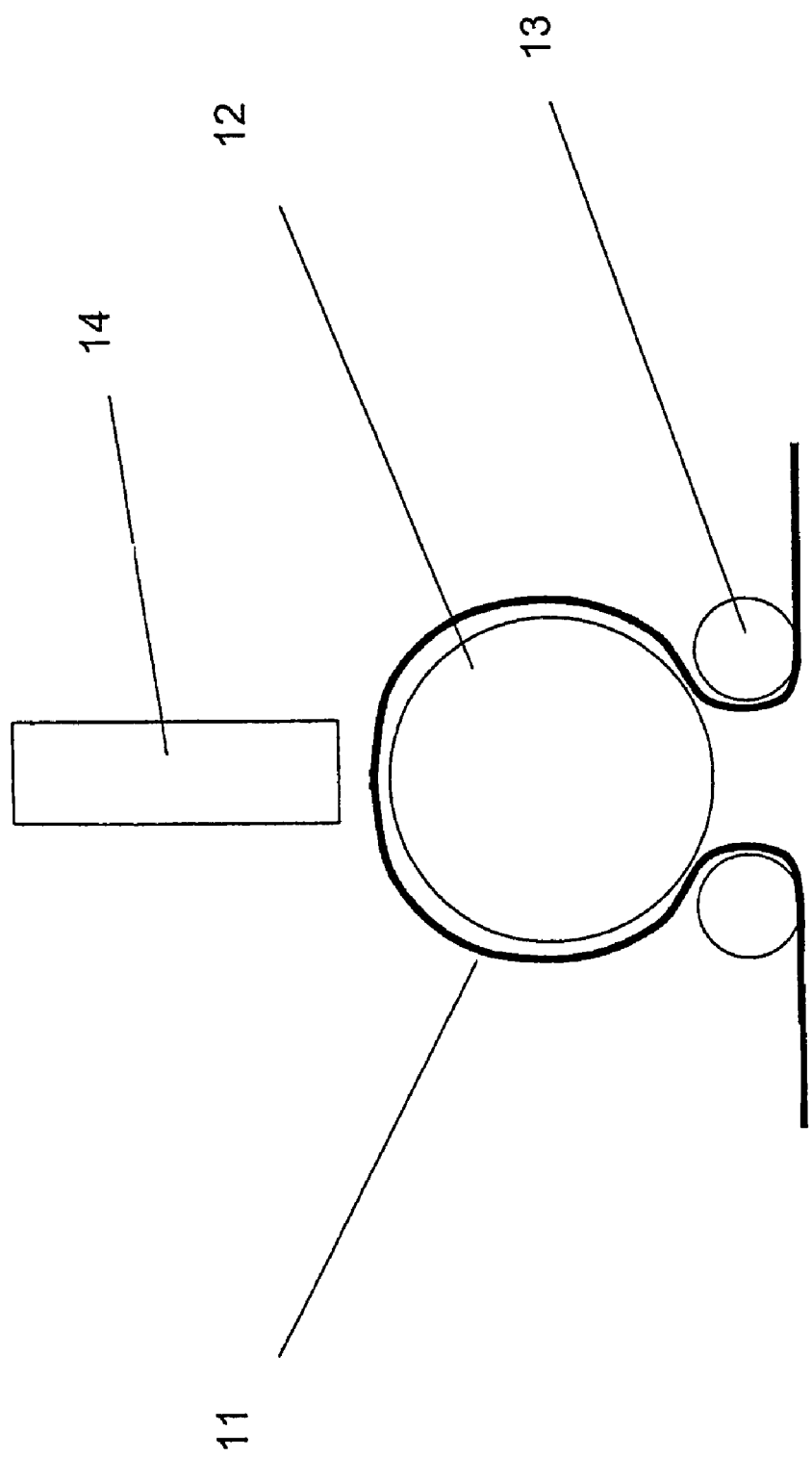
FIG. 3 illustrates one embodiment of the invention for recording sound with one imaging unit.

FIG. 3 illustrates one embodiment of the invention for recording sound with one imaging unit 14. The imaging unit 14 may in this embodiment comprise the light source, light modulation device and imaging optics. The film 11 is guided through a film path loop 10 by means of a guiding wheel 12 and two feed wheels 13. The imaging unit 14 is arranged to provide the sound image directly onto the film on top of the loop. This arrangement may be a separate sound recorder, or may be a part of a larger system, such as the system disclosed in PCT application PCT/NO03/00155.

Figure 4:
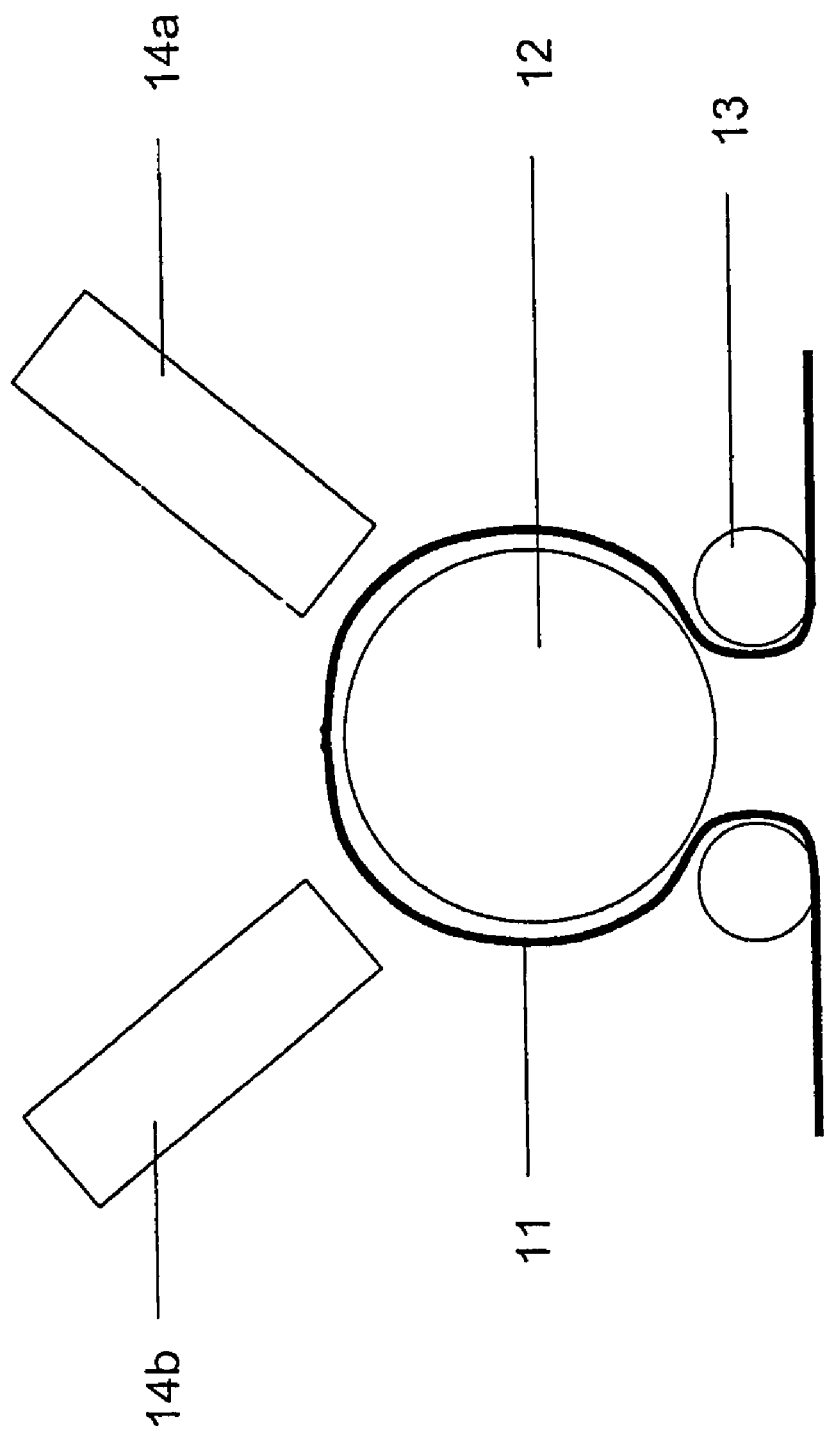
FIG. 4 illustrates another embodiment of the invention with two imaging units.

FIG. 4 illustrates another embodiment of the invention with two imaging units 14a and 14b. This embodiment can be used to record two types of sound tracks on the same film to achieve two of the types described above in connection with FIG. 2.

Figure 5:
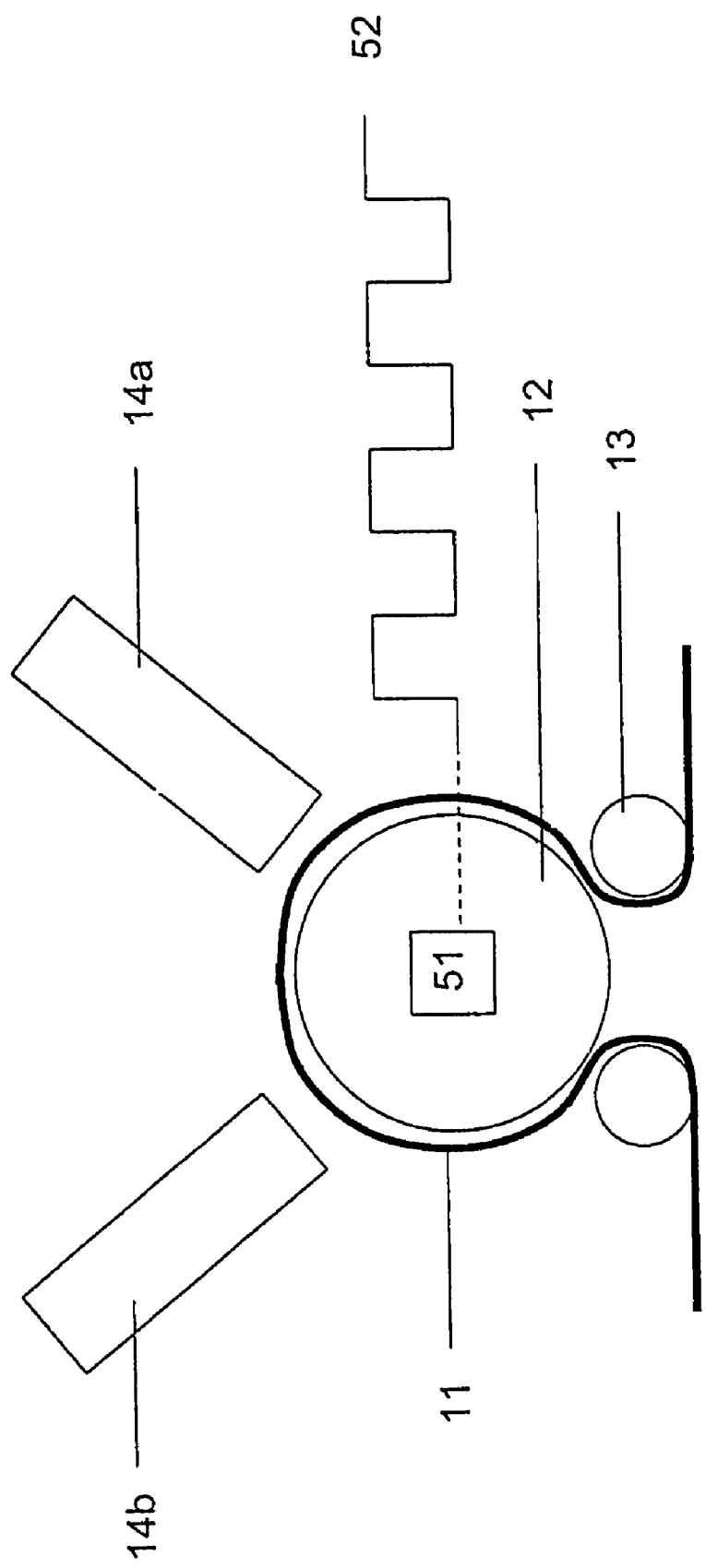
FIG. 5 shows a modification of the embodiment of FIG. 4 with a rotation indicator.

FIG. 5 shows a modification of the embodiment of FIG. 4 with a rotation indicator 51. The rotation indicator 51 counts the rotation and outputs a square waveform signal which may be fed back to a control system to synchronize the recoding of the sound to the pictures.

The invention may be used to record sound directly on positive film, on intermediate film (the picture negative film) or on a separate sound negative film for further copying to positive print film. This provides a flexible, accurate and cost-effective solution compared to prior art.

The invention claimed is:

1. A method for recording digital soundtracks onto film, comprising:
    converting sound data from a digital soundtrack to a full frame of sound image data;
    modulating a full frame of light corresponding to the full frame of the sound image data;
    guiding, via a guiding wheel, a photosensitive film into an exposure area;
    imaging the modulated light onto the photosensitive film in the exposure area;
    sensing a rotation of the guiding wheel using a sensor;
    providing a signal representing the sensed rotation of the guiding wheel; and
    controlling the modulating with the signal so that the modulation is synchronized with the sensed rotation of the guiding wheel.

2. The method according to claim 1, further comprising:
    transporting the photosensitive film with a continuous movement in the exposure area.

3. The method according to claim 1, wherein the modulation is performed by means of a device for full frame light modulation and controlled by a control device.

4. The method according to claim 1, wherein the full frame of the sound image data is a two-dimensional array of pixels representing the digital soundtrack.

5. A device for recording digital soundtracks onto film, comprising:
    at least one light source;
    processing electronics for converting sound data from a digital soundtrack to a full frame of sound image data;
    at least one full frame modulating device connected to the processing electronics, adapted for modulating a full frame of light from the light source corresponding to the full frame of the sound image data;
    imaging optics for imaging the modulated light onto a photosensitive film;
    a film transportation device comprising:
        a guiding wheel for moving the film; and
        a sensor for sensing rotation of the guiding wheel and outputting a rotation indicator indicative of the sensed rotation; and
    a control device for controlling the modulating device with the signal so that the modulation is synchronized with the movement of the photosensitive film according to the rotation indicator.

6. The device according to claim 5, wherein the film transportation device transports the photosensitive film with a continuous movement.

7. The device according to claim 6, wherein the film transportation device comprises an omega-loop, and the imaging optics are arranged to image the modulated light onto the film in the omega-loop.

8. The device according to claim 7, wherein the omega-loop comprises a guiding wheel for guiding movement of the photosensitive film.

9. The device according to claim 5, wherein the signal is used as feed-back to the processing electronics.

10. The device according to claim 5, wherein the full frame of the sound image data is a two-dimensional array of pixels representing the digital soundtrack.

* * * * *